July 18, 1967      K. H. NORSWORTHY      3,331,955

SIGNAL ANALYZER SYSTEMS

Filed Aug. 19, 1963      3 Sheets-Sheet 1

INVENTOR.
KEITH H. NORSWORTHY

BY

ATTORNEYS

INVENTOR.
KEITH H. NORSWORTHY

BY Reynolds & Christensen

ATTORNEYS

INVENTOR.
KEITH H. NORSWORTHY
BY
ATTORNEYS

United States Patent Office 3,331,955
Patented July 18, 1967

3,331,955
SIGNAL ANALYZER SYSTEMS
Keith H. Norsworthy, Seattle, Wash., assignor to The Boeing Company, Seattle, Wash., a corporation of Delaware
Filed Aug. 19, 1963, Ser. No. 303,121
21 Claims. (Cl. 235—181)

This invention relates to systems and methods for analyzing one or more signals. More particularly, it relates to new techniques for use in time correlation studies and in power spectrum and cross-power spectrum studies of signals and phenomena represented by signals. It relates to systems for computing newly defined ratio functions, closely related to correlation functions and power spectra heretofore well known in the art and furnishing essentially the same information about the signals analyzed as is furnished by these well-known functions. Yet the techniques provided herein permit simplicity of equipment and other advantages hereinafter discussed which are not present in systems previously used in such studies. While the invention is illustratively described in terms of certain preferred forms thereof, it will be recognized that various changes and modifications may be made without departing from the essential features involved.

The *correlation function* $\phi_{12}(\tau)$ of any two time-varying signals $S_1(t)$ and $S_2(t)$ is given by the following well-known formula:

$$\phi_{12}(\tau) = \underset{T\to\infty}{\text{Limit}} \frac{1}{2T} \int_{-T}^{T} S_1(t) S_2(t+\tau) dt \quad (1)$$

where $\tau$ is a time delay parameter, i.e. a selected amount of delay time occurring after the time instant $t$, and T is one-half of the integration period. The *cross-power spectrum* $C_{12}(\omega)$ of the two signals is given by the Fourier transformation of the above formula, expressed as follows:

$$C_{12}(\omega) = \frac{1}{2\pi} \int_{-\infty}^{\infty} e^{-j\omega\tau} \phi_{12}(\tau) d\tau \quad (2)$$

$$C_{12}(\omega) = \frac{1}{2\pi} \int_{-\infty}^{\infty} (\cos \omega\tau - j \sin \omega\tau) \phi_{12}(\tau) d\tau \quad (3)$$

$$C_{12}(\omega) = P_{12}(\omega) - jI_{12}(\omega) \quad (4)$$

where $\omega$ is the angular frequency for which each spectrum ordinate is determined, and $P_{12}(\omega)$ and $I_{12}(\omega)$ are the real and imaginary components, respectively, of the cross-power spectrum $C_{12}(\omega)$. Both correlation studies and power spectrum studies are more fully discussed in my copending application entitled "Multichannel Correlator System," Ser. No. 256,187, filed Jan. 17, 1963.

While the invention is herein described in terms of measurement of time correlation functions and power spectra of time frequencies, it will be recognized by those skilled in the art that equivalent approaches may be used for measuring space correlation functions (in which the averaging may be peformed in a time or a space domain) and power spectra of space frequencies.

It is evident from Equation 1 that the output of a system which computes the correlation function is directly proportional to each of the input signals. Thus when a variation in output occurs it is not evident, normally, whether the variation is due to a variation in the R.M.S. value of an input signal or a variation in the amount of correlation between the signals. This difficulty is often obviated by computing the normalized correlation function $N_{12}(\tau)$, which is defined as the ratio of the correlation function to the product of the R.M.S. values of the two input signals:

$$N_{12}(\tau) = \frac{\underset{T\to\infty}{\text{Limit}} \frac{1}{2T} \int_{-T}^{T} S_1(t) S_2(t+\tau) dt}{[S_1(t)]_{rms}[S_2(t)]_{rms}} \quad (5)$$

The output of a system which computes this function is thus independent of changes in the R.M.S. value of either or both input signals. Such a system is subject to the remaining limitation, however, that its output is directly proportional to the amount of correlation between the signals. For example it is difficult to obtain meaningful or accurate results when the amount of correlation between signals is very small relative to the amount of noise or distortion in the system, or when the input signal levels or the amount of correlation fluctuates widely with time. While automatic gain control devices may be employed to render the signal somewhat less obscure, such devices cannot remedy the difficulty entirely. This same difficulty appears in a system which computes power spectra from the correlation function, since by Equation 2 the power spectrum is directly related to the amount of correlation between the signals.

In correlation studies, as well as in the closely related power spectrum studies, the shape of the function is often of greater interest than is its magnitude at any particular point. That is, observations of how the amount of correlation varies with changes in the amount of delay between the signals, or observations of how the power is distributed with respect to frequency, are more significant than absolute measurements of these quantities.

Accordingly, it is the primary object of this invention to provide novel systems and techniques for signal analysis which are not limited to computation of the usual correlation functions and power spectra functions themselves, but which employ newly developed derivative functions thereof which are not dependent upon either the R.M.S. values of input signals, or upon the actual magnitude of the correlation between or power common to the two signals. Three such functions are defined herein and novel apparatus and techniques are disclosed for their computation. The first of these functions is the *correlation ratio function* $R_{12}(\tau, \bar{\tau})$, defined as the ratio of the correlation function for various values of delay $\tau$ to the correlation coefficient for a fixed reference delay value $\bar{\tau}$:

$$R_{12}(\tau, \bar{\tau}) = \frac{\phi_{12}(\tau)}{\phi_{12}(\bar{\tau})} \quad (6)$$

This function $R_{12}(\tau, \bar{\tau})$ for different signals $S_1(t)$ and $S_2(t)$ may be technically referred to as the *cross-correlation ratio function* to distinguish it from the *auto-correlation ratio function*, which is the special case of the above where signals $S_1(t)$ and $S_2(t)$ are identical. The reference parameter $\bar{\tau}$ is usually chosen according to the value of $\tau$ for which $R_{12}(\tau, \bar{\tau})$ is a maximum, though other values may be chosen. In the case of auto-correlation the maximum always occurs at zero delay, so that one form of the *auto-correlation ratio function* may be written as follows:

$$R_{11}(\tau, 0) = \frac{\phi_{11}(\tau)}{\phi_{11}(0)} \quad (7)$$

The second function is the *cross-power ratio function* $E_{12}(\omega, \bar{\omega})$ defined as the ratio of the cross-power spectrum ($C_{12}(\omega)$ of two signals $S_1(t)$ and $S_2(t)$ for various frequencies $\omega$ to the cross-power ordinate measured at a particular reference frequency $\bar{\omega}$:

$$E_{12}(\omega, \bar{\omega}) = \frac{C_{12}(\omega)}{C_{12}(\bar{\omega})} \quad (8)$$

Equation 8 is a complex expression of the form $$E = \frac{X - jY}{U - jV}$$

Since it is difficult to deal directly with such vector quantities, the function is studied by separately comparing real and imaginary components of the power spectrum $C_{12}(\omega)$ and the power spectrum ordinate $C_{12}(\bar{\omega})$ in any of different combinations corresponding to the forms:

$$\frac{X}{U}, \frac{X}{V}, \frac{X}{Y}, \frac{Y}{U}, \frac{Y}{V}, \frac{Y}{X}, \frac{U}{V}, \frac{U}{X}, \frac{U}{Y}, \frac{V}{U}, \frac{V}{X}, \frac{V}{Y}$$

For example, one suitable expression for deriving the cross-power ratio function $E_{12}(\omega, \bar{\omega})$ from separately derived components is:

$$E_{12}(\omega, \bar{\omega}) = \left[K_1 \frac{X}{U} + K_2 \frac{Y}{V}\right] - j\left[K_1 \frac{Y}{U} - K_2 \frac{X}{U}\right] \quad (9)$$

where $X = P_{12}(\omega)$, $Y = I_{12}(\omega)$, $U = P_{12}(\bar{\omega})$, $V = I_{12}(\bar{\omega})$, $$K_1 = \frac{U^2}{U^2 + V^2}$$

and $$K_2 = \frac{V^2}{U^2 + V^2}$$

In many practical cases, rather than compute the entire complex function $E_{12}(\omega, \bar{\omega})$, it is preferred to compute one or more simplified cross-power ratio functions, such as:

$$D_{12}\omega, \bar{\omega} = \frac{C_{12}(\omega)}{P_{12}(\bar{\omega})} = \frac{X}{U} - j\frac{Y}{U} \quad (10)$$

or $$D_{12}'(\omega, \bar{\omega}) = \frac{C_{12}(\omega)}{I_{12}(\bar{\omega})} = \frac{X}{V} - j\frac{Y}{V} \quad (11)$$

The simplified cross-power ratio function $D_{12}(\omega, \bar{\omega})$ possesses the desirable feature of being of identical shape to the cross-power spectrum $C_{12}(\omega)$, yet it is substantially independent of both the magnitude of and the degree of mutual dependence between the input signals.

In order to simplify explanation of the invention, discussion of system operation hereafter proceeds on the assumption that only the real components corresponding to X and U are studied and that the system is arranged to compute the *cross-power coordinate ratio function* $H_{12}(\omega, \bar{\omega})$ defined as:

$$H_{12}(\omega, \bar{\omega}) = \frac{P_{12}(\omega)}{P_{12}(\bar{\omega})} = \frac{X}{U} \quad (12)$$

Modifications of this system for studying other combinations and for combining separately derived components to derive the cross-power ratio function $E_{12}(\omega, \bar{\omega})$, or other more simplified ratio functions, will be recognized by those skilled in the art.

The third function dealt with herein is termed the *cross-power function* $F_{12}(\omega)$, defined as the ratio of the cross-power spectrum $C_{12}(\omega)$ of two signals $S_1(t)$ and $S_2(t)$ to the mean square of the undelayed or reference signal $S_1(t)$:

$$F_{12}(\omega) = \frac{C_{12}(\omega)}{S_1(t)^2} \quad (13)$$

Each of the above functions represents a ratio conveying information by its shape, rather than its magnitude with respect to any fixed reference level. In each case, however, it is evident that the traditional information can be obtained from the output of the system computing the function by a simple mathematical operation. For example, the correlation function $\phi_{12}(\tau)$ may be obtained from the correlation ratio function $R_{12}(\tau, \bar{\tau})$ by an arrangement which multiplies the output by the reference correlation coefficient $\phi_{12}(\bar{\tau})$. Likewise, the cross-power spectrum $C_{12}(\omega)$ can be obtained from the cross-power function $F_{12}(\omega)$ by multiplying this function by the mean square of signal $S_1(t)$, and from the cross-power ratio function $E_{12}(\omega, \bar{\omega})$ by multiplying by the reference cross-power ordinate $C_{12}(\bar{\omega})$, and from the simplified cross-power ratio function $D_{12}(\omega, \bar{\omega})$ by multiplying by the reference real cross-power ordinate $P_{12}(\bar{\omega})$.

Therefore an additional object of the invention is to provide a signal analyzer system which, while computing the above-defined new ratio functions, is adaptable to compute from these functions to the corresponding correlation functions and power spectra.

While the invention is herein described in terms of embodiments arranged to compute any of the foregoing functions in a single output, it will be recognized that the same is adapted for incorporation in multichannel versions as well. A further object, therefore, is to provide correlator and power spectrum measuring techniques and equipment operable to compute the required functions in a single output by sequential changes in delay times and power spectrum weighting, but which may be arranged in multichannel form to compute a multiplicity of ratio function ordinates simultaneously in a multiplicity of output channels.

It is a further object of the invention to provide an analyzer system which is capable of detecting and measuring smaller amounts of correlation or common energy between signals with greater accuracy than prior systems, and at the same time having a greater dynamic range of operation.

A further object is to provide an analyzer which is much simpler in construction, hence less expensive than prior systems, particularly in the case of its embodiments for computing cross power functions.

Another important object of the invention is to provide a signal analyzer device for computing functions mathematically requiring multiplications without necessity for actually performing such multiplications, thereby conferring additional advantages on the system.

Another object hereof is to provide an analyzer operable upon signals of higher frequencies than previous correlator or power spectrum devices.

With the above objects in view, a system according to this invention for analyzing relationships between first and second input signals adds successions of time-related values (meaning either samples or values of continuously applied signals) of one of the first and second input signals to successions of time-related values of the second input signal, the latter successions of values bearing a predetermined time relation to the former. These successions of values are added together with relative weighting so that they bear a ratio K to each other apart from their instantaneous variable ratio due to variations in their respective instantaneous values. This ratio K is varied in accordance with the invention as presently to be explained, and is referred to as the variable summing ratio K to distinguish it from further relative weighting of the added successions of signal values as established according to other aspects of the invention.

A mean product polarity indicator in the system operates upon the sum and the first input signal to form intermediate signal values which indicate occurrence and polarity of deviations, from a predetermined reference level, of the mean product of the sum and first input signal. As deviations of the mean product from the predetermined reference level are indicated by the intermediate signal values, the variable summing ratio of the summing means is adjusted in directions opposing the deviations to compensate therefor and to maintain the mean product equal to the reference level. The summing ratio itself constitutes the output of the system, so that a summing ratio indicator responsive thereto gives the ratio function being computed.

The above described features of the system are utilized in different combinations, together with additional features presently to be mentioned, according to the particular function being computed for signal analysis. For example, when computing the *correlation ratio function* $R_{12}(\tau, \bar{\tau})$ the system adds together separate successions of time-related values of the second input signal, values in each succession bearing predetermined time relationships to the first input signal. Thus values in the first succession of second input values correspond to a predetermined reference delay amount $\bar{\tau}$, while the second succession corresponds to a variable delay amount $\tau$, with respect to the first input signal. The reference delay amount $\bar{\tau}$ is held at a fixed value (which may be zero) with respect to the first input signal to generate circuit information signals related to the correlation coefficient $\phi_{12}(\bar{\tau})$ with respect to which the correlation ratio function is computed. When the function is generated in a single output it is computed for one delay time $\tau$ at a time. Thus the delay value $\tau$ is varied cyclically through predetermined values, holding each such delay value for a period sufficient to generate, in effect, a value of the correlation function $\phi_{12}(\tau)$ corresponding to each such value. The separate successions of delayed second signal values are added in the aforementioned variable summing ratio K, and the sum and the first input signal are operated upon to form the intermediate signal values. The signal indicating at least polarity of the mean product of the sum and first input signal is maintained equal to the reference level, usually zero, so that the value of the summing ratio K gives the correlation ratio function $R_{12}(\tau, \bar{\tau})$. It will be recognized that values of the function $R_{12}(\tau, \bar{\tau})$ corresponding to different predetermined values of delay $\tau$ may be computed in different output channels corresponding to each of which the delay parameter $\tau$ is a constant, rather than a variable as in the single-output embodiments of the system illustrated herein.

When computing the *cross-power coordinate ratio function* $H_{12}(\omega, \bar{\omega})$ of first and second input signals, the system delays separate successions of values of the second input signal with respect to the first input signal by variable amounts $\bar{\tau}$ and $\tau$, respectively. The separate successions of signal values are then weighted (multiplied) by variable amounts $\bar{g}$ and $g$ in first and second weighting means, respectively. The variable delay time $\bar{\tau}$ is varied to produce delayed signal values which are respectively weighted according to the weighting function $\bar{g}$ in a manner whereby to generate circuit information signals related to the real cross-power ordinate $P_{12}(\bar{\omega})$ for a selected reference $\bar{\omega}$. At the same time the delay amount $\tau$ is varied to derive signal values which are weighted according to the function $g$ in a manner whereby to generate circuit information signals for deriving the real cross-power spectrum $P_{12}(\omega)$ for all frequencies $\omega$. The weighted signal values are then added together in the variable summing ratio K, as in the embodiment first discussed, and the sum and the first input signal are operated upon to form intermediate signal values which are maintained equal to the predetermined reference level. The summing ratio K then continuously indicates the value of the cross-power coordinate ratio function $H_{12}(\omega, \bar{\omega})$ for all values of frequency $\omega$ for which the same is computed.

When computing the real component of the *cross-power function* $F_{12}(\omega)$ a single succession of values of the second input signal is delayed by a variable amount $\tau$, weighted by a variable amount $g$, and added to the first input signal in the variable summing ratio K. The delay amount $\tau$ is varied to derive signal values which are weighted according to the function $g$ in a manner to generate circuit information for deriving the real cross-power spectrum $P_{12}(\omega)$ for all frequencies $\omega$. The sum and the first input signal are then operated upon as before to form intermediate signal values which are maintained equal to the predetermined reference level. The summing ratio K then continuously indicates the value of the real component of the cross-over function $F_{12}(\omega)$ for all frequencies $\omega$. The imaginary component of the cross-power function $F_{12}(\omega)$ is derived in the same way except that the weighting function $g$ assumes different values.

Any of different techniques are used according to this invention for deriving the intermediate signal values indicating polarity of the mean product of the indicated signals (the sum and first input signal). For this purpose the system includes a mean product polarity indicator having separate input channels to which the sum and first input signal are respectively applied. A technique embodied in one form of mean product polarity indicator is simply to multiply signals in the separate channels and to average the product.

Another technique comprises quantizing the signal in one of the separate channels before its multiplication with the signal in the second channel. ("Quantizing" is here defined as coding the signal whereby its instantaneous values are represented solely by their polarity relative to a reference level.) More specifically, the quantized signal is used to gate the signal in the second channel by separate gating circuits to one of which the second channel signal itself is an input and to the other of which the inverted second channel signal is an input. The inverted or uninverted second channel signal is applied to an averager by the separate gating circuits depending upon the polarity of the quantized first channel signal. In effect, the averager output constitutes the mean value of the second channel signal multiplied by plus or minus one as determined by the polarity of the first channel signal. For first and second channel signals having certain types of amplitude probability distributions, this intermediate signal reliably indicates polarity of the actual mean product of the first and second channel signals. Thus their actual mean product may be maintained equal to zero (or some other reference level) by maintaining this intermediate signal equal to zero.

A third technique for deriving the polarity-indicating intermediate signal comprises quantizing signals in both separate input channels of the mean product polarity indicator, multiplying the quantized signals in a suitable multiplier, averaging the multiplier output and maintaining the resulting mean product equal to zero by the summing ratio-varying means. Again for certain classes of first and second channel signals it can be shown that maintaining this mean product of the quantized signals equal to zero is equivalent to maintaining the actual mean product of the first and second channel signals equal to zero.

A fourth technique for determining mean product polarity employs the familiar squaring technique for multiplying signals. It includes forming the sum of the signals in the separate input channels, forming the difference between signals in the separate input channels, and separately squaring the sum and the difference to form separate output channel signals. The separate output channel signals are then averaged to form separate intermediate signals which are then compared or referenced to each other by a summing ratio-varying means which detects deviations of these separate intermediate signals from equality or some other referencing relationship to each other and adjusts the summing ratio accordingly to maintain the predetermined referencing relationship. Alternatively, the separate output channel signals may be subtracted to form a second difference, and this difference averaged to form the intermediate signal which is then applied to the summing ratio-varying means.

A fifth technique also includes forming the sum and the difference of signals in the separate input channels. The sum and difference are then separately operated upon by the same nonlinear transfer function by applying them to elements such as rectifiers having the same nonlinear characteristic. The resulting signals are then separately averaged to form separate intermediate signals which are maintained in a predetermined referencing relationship to each other by the ratio-varying means. Alternatively, the resulting signals are subtracted and the difference averaged to form a single intermediate signal. It can be shown that for certain classes of first and second channel signals, including those having Gaussian distributions, this technique reliably indicates the required mean product polarity.

These and other features, objects and advantages of the invention will become more apparent from the following more detailed description taken in connection with the accompanying drawings which illustrate preferred forms thereof.

Figures 1, 1A, 2:
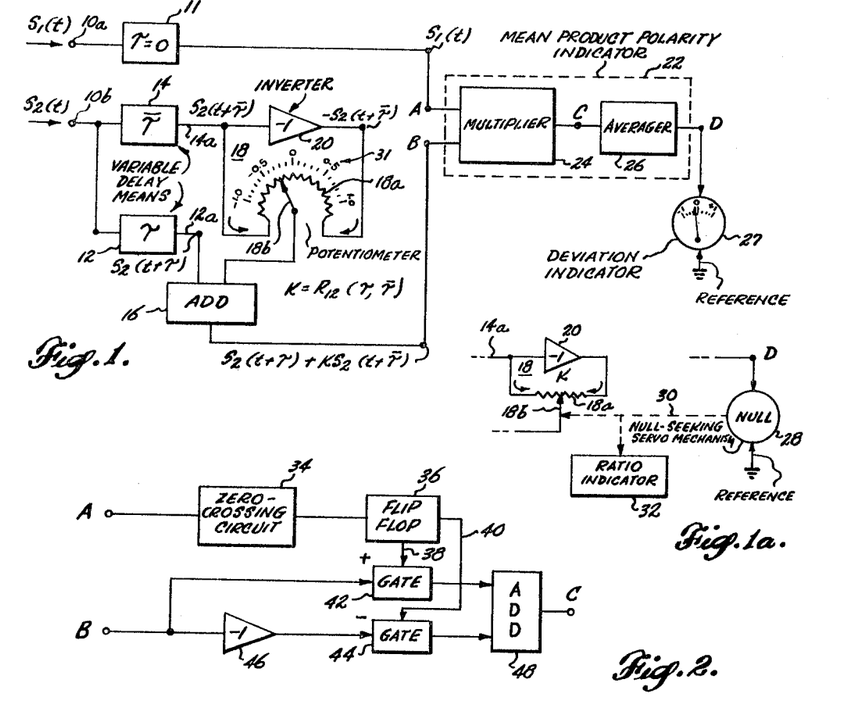
FIGURE 1 is a block diagram of the embodiment of the invention operable to compute the *correlation ratio function* $R_{12}(\tau, \bar{\tau})$.
FIGURE 1a illustrates means for employment, in the system of FIGURE 1, of a null technique to adjust the ratio K automatically, a feature incorporated in the remaining embodiments of the invention.
FIGURE 2 is a block diagram of a quantizing circuit, to be employed in the mean product polarity indicator in FIGURE 1, for quantizing signals in one of its channels and operating upon the quantized and unquantized signals to form product-polarity-indicating intermediate signal values.

Certain basic features of the invention are included in the signal analyzer system shown in block diagram form in FIGURE 1, which illustrates the embodiment for computing the correlation ratio function $R_{12}(\tau, \bar{\tau})$. Signals $S_1(t)$ and $S_2(t)$, which may be the same or different signals represented by varying voltage or current, are applied to separate system inputs 10a and 10b. Signal $S_2(t)$ is delayed with respect to signal $S_1(t)$ in separate variable-delay means 12 and 14 by delay times $\tau$ and $\bar{\tau}$, respectively. The system may be operated as a continuous input system or with sampled input signals. In the former case delay means 12 and 14 comprise suitable means for delaying continuous signals, such as by recording and playback. In the latter case signal $S_1(t)$ is sampled in zero-delay means 11 at successive times $t$ and signal $S_2(t)$ is sampled in the variable-delay means 12 and 14 at successive times delayed from samplings of $S_1(t)$ by delay times $\tau$ and $\bar{\tau}$, respectively.

The delayed signals $S_2(t+\tau)$ and $S_2(t+\bar{\tau})$ in delay means outputs 12a and 14a, respectively, are added together in adding means 16 in a variable summing ratio established by the potentiometer circuit 18. The inverter 20, responsive to delay means output 14a, inverts the delayed output signal $S_2(t+\bar{\tau})$ thereof and applies the inverted signal $-S_2(t+\bar{\tau})$ to one terminal of the potentiometer resistor 18a, to the other terminal of which is applied the uninverted signal $S_2(t+\bar{\tau})$. The potentiometer output wiper 18b constitutes one input terminal of the adding means 16, while delay means output 12a constitutes the other. The potentiometer circuit 18 in effect multiplies its input $S_2(t+\bar{\tau})$ by a factor K whose value depends upon the position of wiper 18b, thus establishing the variable summing ratio of the adding means inputs. The presence of the inverter permits the factor K to traverse positive and negative values. The factor K is varied in any of different ways in accordance with values indicated by the deviation indicator 27 whose function will be explained presently. The settings or instantaneous values of K represent values of the desired output function, in this case the correlation ratio function $R_{12}(\tau, \bar{\tau})$, indicated at 31.

The remainder of the analyzer system comprises means operative upon the adding means output signal $S_2(t+\tau)+KS_2(t+\bar{\tau})$ and the first input signal $S_1(t)$ to indicate appropriate settings or values of K to produce the desired output function. The mean product polarity indicator 22 comprises separate input channels having inputs A and B which are responsive respectively to the undelayed input signal $S_1(t)$ and the adding means output signal $S_2(t+\tau)+KS_2(t+\bar{\tau})$. It generates from signals in its separate input channels intermediate signal values indicating the polarity, with respect to a predetermined reference level, of the mean product of the signals in such channels. As will appear more fully hereinafter, it is not necessary that the mean product of the signals in the separate channels actually be formed in the circuit. The mean product polarity indicator 22 in FIGURE 1, however, comprises multiplier circuit 24 and averaging circuit 26 which actually form the mean product $\overline{AB}$ of signals applied to separate inputs A and B, thus:

$$\overline{AB}=\overline{S_1(t)[S_2(t+\tau)+KS_2(t+\bar{\tau})]} \quad (14)$$

where the overline denotes averaging of all the products taken of the factors thereunder.

This mean product output signal of averaging circuit 26 is applied through output D to the deviation indicator 27, which compares the mean product signal to zero (or some other reference level) and indicates the polarity of deviations of the mean product from zero. The potentiometer wiper 18b is adjusted in accordance with such deviations and in a direction to maintain the mean product to zero. Thus:

$$\overline{S_1(t)[S_2(t+\tau)+KS_2(t+\bar{\tau})]}=0 \quad (15)$$

This result may be attained in any of different ways, such as by automatic adjustment of the potentiometer by the feedback loop arrangement shown in FIGURE 1a. Here the mean product output signal at D is applied to a null-seeking servo-mechanism 28 which compares the mean product signal to zero and operates automatically through connection 30 to change the position K of the potentiometer wiper 18b in a direction to maintain the mean product equal to zero. An output ratio indicator 32 shows or records the position of potentiometer wiper 18b, thereby indicating the value of the factor K.

Other techniques for varying K to establish the summing ratio will be recognized by those skilled in the art. For example the potentiometer 18 may be replaced by a relay which switches between input and output terminals of inverter 20 to compensate for deviations of the intermediate signal at D from the predetermined reference level. The output could then be derived as a function of the average times spent by the relay in its alternative end positions.

The factor K (or −K) as indicated for example by the ratio indicator 32, is seen from Equation 15 to be the ratio:

$$-K=\frac{\overline{S_1(t)S_2(t+\tau)}}{\overline{S_1(t)S_2(t+\bar{\tau})}} \quad (16)$$

Equation 1, which gives the definition of the correlation function, can be rewritten with different symbolism as follows:

$$\phi_{12}(\tau) = \overline{S_1(t)S_2(t+\tau)} \quad (17)$$

Therefore, the ratio —K (Equation 16) is seen to be proportional to the correlation ratio function:

$$-K = \frac{\phi_{12}(\tau)}{\phi_{12}(\bar{\tau})} = R_{12}(\tau, \bar{\tau}) \quad (18)$$

Figure 7A:
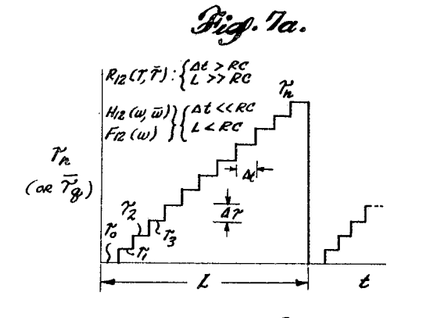
FIGURES 7a and 7b are timing diagrams illustrating changes in time delays $\tau_n$ and power spectrum weighting $g_{mn}$, respectively, when varied in stepwise fashion.

This function is generated over a period of time during which the reference time delay $\bar{\tau}$ is maintained at a constant value by the delay means 14 to generate the correlation coefficient $\phi_{12}(\bar{\tau})$. Often, $\bar{\tau}$ is chosen as or adjusted to a value for which the correlation coefficient $\phi_{12}(\bar{\tau})$ is a maximum. While $\bar{\tau}$ is held constant, the delay time $\tau$ is varied to generate the correlation function $\phi_{12}(\tau)$. In FIGURE 7a $\tau$ is shown to increase in stepwise fashion with equal increments $\Delta\tau$ and equal dwell times $\Delta t$ for all delay values $\tau_n$, hence a linear increase in $\tau$. (However, in some cases $\tau$ is varied in continuous fashion, such as according to a sawtooth waveform as in FIGURE 8a, or it may be varied according to other, nonlinear functions.) Information contributing to individual correlation coefficients $\phi_{12}(\tau_n)$ is generated during the individual dwell times $\Delta t$, which are of a length greater than the effective time constant RC of the averaging means in the mean product polarity indicator 22. Thus successions of predetermined delay times $\tau_n$ are applied cyclically to generate signal values contributing, in effect, to computations of the correlation function $\phi_{12}(\tau)$, the numerator of the correlation ratio function $R_{12}(\tau, \bar{\tau})$.

Automatic adjustment of the ratio K in accordance with FIGURE 1a, for example, takes place continuously, but with some time lag relative to actual variations in correlation between the signals due to the integrating (averaging) characteristic of the system. The output ratio indicator 32 is synchronized with cyclical changes in the delay time $\tau$, with corrections for the time lag, so that it repeatedly plots the function for the predetermined set of delays $\tau_n$.

It will be useful at this point to discuss other embodiments of the mean product polarity indicator 22, reserving for later description modifications of the system for computing the cross-power function and cross-power ratio function.

The basic purpose of the mean product polarity indicator 22 is to indicate when the mean product $\overline{AB}$ of signals at A and B deviates from the zero reference level, and the polarity or direction of such deviations. The actual signals it operates upon and the output signal values it produces to indicate such deviations must reliably indicate their occurrence and polarity, but need not be representative of the magnitude of the mean product itself. This is because the mean product does not constitute the output as in previous correlator systems, but is merely an intermediate signal utilized to produce the output. It will be seen that this fact enables the multiplying means to be simplified in sharp contrast to prior systems.

For example, rather than actually multiplying the signals at A and B and averaging the product, in the circuit shown in FIGURE 2 the A signal is coded or "quantized" before multiplication with the B signal. This circuit, which replaces the multiplier 24 in FIGURE 1, comprises in the A channel a zero-crossing circuit 34 which triggers a bistable or flip-flop circuit 36 having a positive output 38 and a negative output 40 respectively connected to gating circuits 42 and 44 in the B channel. The B signal is applied to gating circuit 42 and to an inverter 46 whose output is applied to gating circuit 44, and both gating circuit outputs are applied to the adding circuit 48 which in turn feeds the averaging circuit 26 (FIGURE 1). The A signal is thus represented in the flip-flop circuit outputs only by its polarity relative to zero. Gate circuit 42 is triggered "open" when the A signal is positive, thereby applying the B signal to the adding circuit 48, and gate circuit 44 is triggered "open" when the B signal is negative, applying the inverted B signal to the adding circuit 48, which is an isolating circuit merely serving to pass to the averaging circuit 26 whichever B signal (inverted or uninverted) is applied thereto by the gate circuit.

Figure 3:
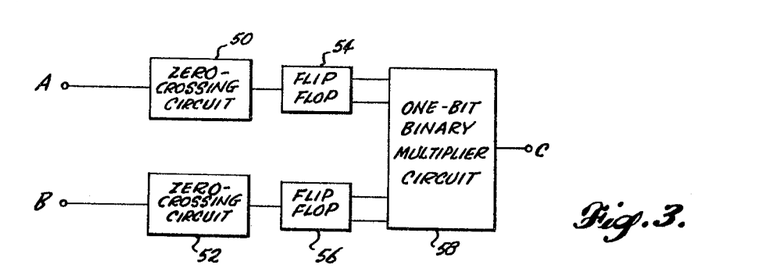
FIGURE 3 is a block diagram of a second quantizing circuit to be similarly employed in the mean product polarity indicator in FIGURE 1 for quantizing signals in both its channels.

In the circuit shown in FIGURE 3 both A and B signals are quantized in zero-crossing circuits 50 and 52 and flip-flop circuits 54 and 56, respectively. The quantized signals are multiplied in a one-bit binary multiplier 58 whose output C is applied to the averaging circuit 26 (FIGURE 1) as before.

Neither of the circuits of FIGURES 2 and 3 produces a signal at C which when averaged represents the true mean product $\overline{AB}$ of signals applied at A and B. However, it is known that for Gaussian signals A and B the mean product $\overline{AB}$ is suitably represented for certain purposes by the mean product of one of the signals B and the other quantized, $A_c$. This condition, $(\overline{AB} \propto \overline{A_cB})$ has been shown to be true also for certain other classes of signals, such as sine-wave signals, for example. In addition, it is known that for certain purposes the mean product $\overline{AB}$ of Gaussian signals is suitably represented by the mean product of both signals quantized, $\overline{A_cB_c}$.

The present invention, however, is not concerned with whether the proportionalities $\overline{AB} \propto \overline{A_cB} \propto \overline{A_cB_c}$ are true for all values of the mean product $\overline{AB}$, but only whether they are true when the mean product is zero. Accordingly, it can be shown, in fact for a broader class of signals than just those having Gaussian distributions, that the following conditions are true:

$$\overline{A_cB} = \overline{A_cB_c} = 0, \text{ when } \overline{AB} = 0 \quad (19)$$

and $$\text{Sign of } \overline{A_cB} = \text{sign of } \overline{A_cB_c} = \text{sign of } \overline{AB} \quad (20)$$

For example, the circuit of FIGURE 3 which quantizes both signals can be shown to produce reliable results whether or not both signals are Gaussian, if one of the signals has an amplitude probability distribution which is symmetrical.

The fact that this invention requires only enough circuitry to indicate the polarity of the mean product $\overline{AB}$ virtually eliminates difficulties associated with losses of gain characteristic of multiplier circuits. For example, since the A and B signals are represented in the circuit of FIGURE 3 solely by their polarity relative to zero, the output of the system is entirely independent of the magnitude and the dynamic range of the input signals. In addition, drift is less a problem inasmuch as the only requirement for stability in the feedback loop system is that stability be good at zero.

It is well known that the product of two signals is proportional to the difference between the square of the sum of the signals and the square of the difference between the signals. This principle is employed to obtain the mean product of the A and B signals in the embodiment shown in FIGURE 4. The sum of the signals A and B is derived in the adding circuit 60 and their difference is derived by first inverting the A signal in inverter 64 and adding the inverted signal to the B signal in adding circuit 62. The adding circuit outputs M and N are respectively applied to squaring circuits 66 and 68 whose outputs are averaged in averaging circuits 70 and 72, respectively.

Figure 4:
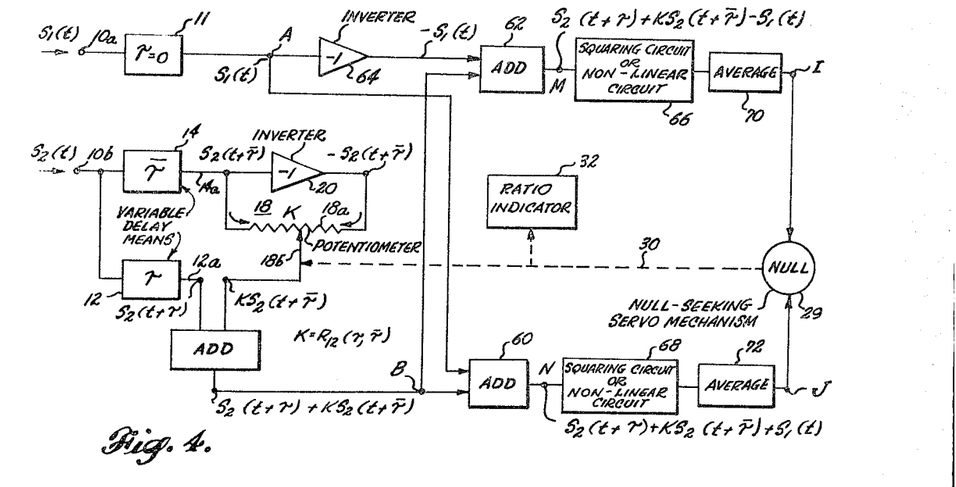
FIGURE 4 is another block diagram of the embodiment for computing the *correlation ratio function* $R_{12}(\tau,\bar{\tau})$, and showing alternative means for forming the intermediate signal values indicating mean product polarity.

The averaging circuit outputs I and J are applied to a null-seeking servomechanism 29 which balances the two signals by detecting differences therebetween and the polarity of the differences, and adjusting the potentiometer wiper 18b in a direction to correct for the differences. In effect, the mean product of the A and B signals is thereby actually obtained and set equal to zero.

But since true multiplication is not necessary, adjustment of the ratio K only requires detection of deviations of the mean product from zero. According to another embodiment of the invention, therefore, circuits having matched (identical) nonlinear characteristics are substituted for the squaring circuits in FIGURE 4. It can be shown that for certain types of signals this substitution is feasible because balancing the mean value of the signals passed through such nonlinear elements is equivalent to balancing the mean square of such signals. For example, nonlinear rectifiers can be substituted for the squaring circuits and the mean rectified values of the M and N signals balanced, rather than the mean squared values of those signals, if the amplitude probability distributions (APD's) of the M and N signals have identical *shapes*. This is not an unreasonable or cumbersome requirement inasmuch as for most practical input signals $S_1(t)$ and $S_2(t)$ it will be true that the APD shapes of the M and N signals are identical.

It is known that the average rectified value of a signal is related to its root-mean-square value by a constant of proportionality which is a function of the shape of its APD. If this constant is known, the rectified signal can be used rather than its squared value. In the present invention it is not necessary to know this constant of proportionality, nor the shape of the APD, but only that the shapes of the APD's of the M and N signals are alike, which will be true for many practical input signals. This is because the present system is concerned only with conditions and characteristics of the M and N signals when their mean product is equated to zero, or when their respective averaged values are balanced against each other.

Employment of rectifiers or other nonlinear elements in the FIGURE 4 arrangement eliminates the requirement for a multiplier, which fact results in lower equipment costs, higher frequency capability, and greater dynamic range for the whole system. Multipliers and squaring circuits are characterized by a square-law relationship of output to input, so that when operating with widely varying input signal values some form of gain control is usually necessary in order that the system will not be required to operate at very high voltage on the one hand and very low voltage on the other. Nonlinear elements such as rectifiers, in contrast, do not possess this square-law characteristic, but have a nearly linear relationship between averaged values of output and input, which means that the output dynamic range bears a linear relationship to the input dynamic range. This fact, coupled with the fact that the instrument computes ratios whose magnitudes are essentially independent of the actual magnitudes of the input signals or the actual magnitude of the correlation therebetween, enables the whole system to operate with much greater dynamic range without necessity for gain control. Moreover, while multipliers normally must meet rather strict requirements of gain stability, lack of drift, and others, essentially the only requirement of the nonlinear circuits in this system is that they matched nonlinearity.

Figure 5:
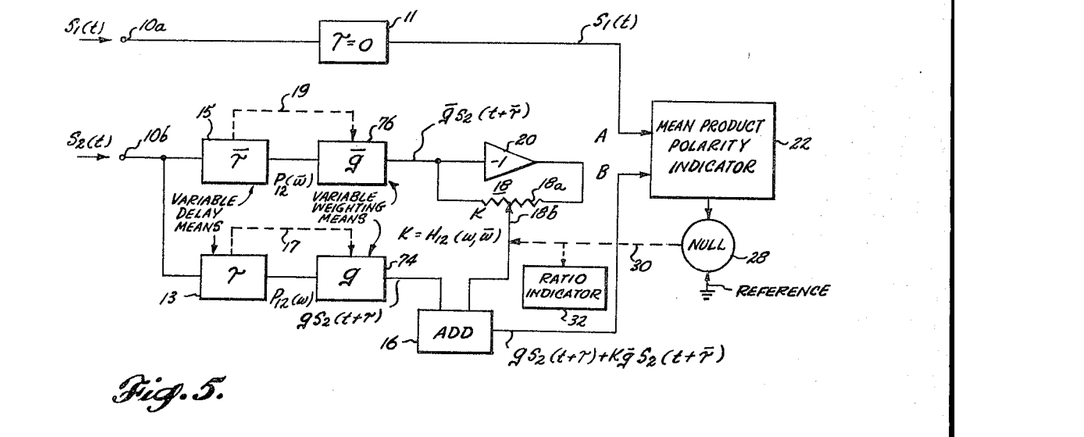
FIGURE 5 is a block diagram of the embodiment for computing a *cross-power coordinate ratio function* $H_{12}(\omega, \bar{\omega})$.

The analyzer system embodiment shown in FIGURE 5 computes the *power spectrum coordinate ratio function* $H_{12}(\omega, \bar{\omega})$ (Equation 12). Signals $S_1(t)$ and $S_2(t)$ are applied respectively to inputs 10a and 10b, the latter of which conducts signal $S_2(t)$ to separate channels in which it is delayed and weighted by different predetermined amounts to derive circuit information corresponding to the real cross-power spectrum $P_{12}(\omega)$ and the real cross-power ordinate $P_{12}(\bar{\omega})$, respectively. In the channel corresponding to $P_{12}(\omega)$ signal $S_2(t)$ is delayed by a variable amount $\tau$ in delay means 13 whose output signal $S_2(t+\tau)$ is then weighted by a variable amount $g$ in weighting means 74. In the channel corresponding to the real cross-power ordinate $P_{12}(\bar{\omega})$ signal $S_2(t)$ is delayed by a variable amount $\bar{\tau}$ in delay means 15 whose output signal $S_2(t+\bar{\tau})$ is weighted by a variable amount $\bar{g}$ in weighting means 76. The outputs of the weighing means 74 and 76 are then added in adding means 16 in a variable summing ratio K established by the potentiometer circuit 18 as previously described.

The adding means output signal $gS_2(t+\tau)+K\bar{g}S_2(t+\bar{\tau})$ is applied to input B of the mean product polarity indicator 22, while signal $S_1(t)$ is applied to input A thereof. As described in connection with FIGURES 1 to 4, the mean product polarity indicator 22 applies to the null-seeking servomechanism 28 an intermediate signal corresponding to the mean product $\overline{AB}$ of signals applied at A and B. Servomechanism 28 maintains this intermediate signal equal to zero by varying the ratio K, so that the mean product of the A and B signals themselves is maintained equal to zero:

$$\overline{S_1(t)[gS_2(t+\tau)+K\bar{g}S_2(t+\bar{\tau})]}=0 \qquad (21)$$

The output ratio indicator 32 shows or records the position of the potentiometer wiper 18b as adjusted by the servomechanism 28 in maintaining the mean product equal to zero, so that from Equation 21 the factor K is seen to be the ratio:

$$-K=\frac{\overline{gS_1(t)S_2(t+\tau)}}{\overline{\bar{g}S_1(t)S_2(t+\bar{\tau})}} \qquad (22)$$

As will be explained in detail presently, the parameters $\tau$, $\bar{\tau}$, $g$ and $\bar{g}$ are varied in cyclical fashion while signal values generated thereby are averaged in the mean product polarity indicator, so that under proper conditions of system operation Equation 22 can be rewritten as:

$$-K=\frac{\int_{\tau_{min}}^{\tau_{max}}[\overline{S_1(t)S_2(t+\tau)}]g\,d\tau}{\int_{\bar{\tau}_{min}}^{\bar{\tau}_{max}}[\overline{S_1(t)S_2(t+\bar{\tau})}]\bar{g}\,d\bar{\tau}} \qquad (23)$$

From Equations 3 and 4 it is seen that the real component $P_{12}(\omega)$ of the cross-power spectrum $C_{12}(\omega)$ of signals $S_1(t)$ and $S_2(t)$ can be written as:

$$P_{12}(\omega)=\frac{1}{2\pi}\int_{-\infty}^{\infty}\phi_{12}(\tau)g\,d\tau \qquad (24)$$

where $g$ here represents the expression:

$$g=\cos\omega\tau \qquad (25)$$

Since $\phi_{12}(\tau)=\overline{S_1(t)S_2(t+\tau)}$, Equation 24 can be written as:

$$P_{12}(\omega)=\frac{1}{2\pi}\int_{-\infty}^{\infty}[\overline{S_1(t)S_2(t+\tau)}]g\,d\tau \qquad (26)$$

It is now seen that Equation 23 gives a measure of the cross-power coordinate ratio function as previously defined (Equation 12):

$$-K=\frac{P_{12}(\omega)}{P_{12}(\bar{\omega})}=H_{12}(\omega, \bar{\omega}) \qquad (27)$$

where $$P_{12}(\bar{\omega})=\frac{1}{2\pi}\int_{-\infty}^{\infty}[\overline{S_1(t)S_2(t+\bar{\tau})}]\bar{g}\,d\bar{\tau}$$

wherein $$g=\cos\bar{\omega}\bar{\tau} \qquad (28)$$

Comparison of FIGURE 5 with FIGURE 1 and Equation 22 with Equation 16 shows that the cross-power coordinate ratio function $H_{12}(\omega, \bar{\omega})$ is computed by the system in much the same manner as the correlation ratio function $R_{12}(\tau, \bar{\tau})$, but with the addition of the variable weighting factors $g$ and $\bar{g}$. In computing the correlation ratio function the delay time $\bar{\tau}$ was held constant to establish a fixed reference delay of signal $S_2(t)$ with respect to signal $S_1(t)$. In computing the cross-power coordinate ratio function, on the other hand, delay time $\bar{\tau}$ is varied cyclically through a predetermined set of delay times $\bar{\tau}_q$ (FIGURE 7a) to generate correlation function information signal values with which to compute the reference real cross-power spectrum ordinate $P_{12}(\bar{\omega})$ for the reference frequency $(\bar{\omega})$. At the same time the variable delay times $\tau$ are varied cyclically through a predetermined set of values $\tau_n$ to generate correlation function information with which to compute the real cross-power spectrum function $P_{12}(\omega)$ for a determined set of frequencies $\omega_m$.

In computing the correlation ratio function time delay $\tau$ was varied at a rate such that each of the equal dwell times $\Delta t$ was greater than the effective time constant RC of the averager in the mean product polarity indicator 22 in order to generate information signal values related to different correlation coefficients $\phi_{12}(\tau_n)$. In contrast, both delays $\bar{\tau}$ and $\tau$ are varied in computing the cross-power ratio function at a rate such that their respective sets of predetermined delay times $\bar{\tau}_q$ and $\tau_n$ are repeated several times during each time constant RC. This is because information signal values related to the different correlation coefficients are not separately computed by the system of FIGURE 5, but delay times $\tau$ and $\bar{\tau}$ are varied to generate information signal values, related to correlation coefficients which merely contribute to computation of real cross-power spectra $P_{12}(\bar{\omega})$ and $P_{12}(\omega)$.

Values of weighting $g$ and $\bar{g}$ applied to delayed signals $S_2(t+\tau)$ and $S_2(t+\bar{\tau})$, respectively, determine whether the real or imaginary components of $C_{12}(\omega)$ and $C_{12}(\bar{\omega})$ are being computed. Under the present assumption the real components only are computed, so that each weighting function is a cosine waveform:

$$g = \cos \omega\tau \quad (29)$$
$$\bar{g} = \cos \bar{\omega}\bar{\tau} \quad (30)$$

According to these equations the weighting factor in each channel varies with delay times applied therein and with the frequency of the cross-power ordinate for which signal values are being generated. Since the weighting factor $\bar{g}$ is applied to produce the cross-power ordinate for the fixed reference frequency $\bar{\omega}$, it varies only with variations in the delay time $\bar{\tau}$ as applied in delay means 15. Weighting factor $g$, on the other hand, varies not only with the changes in delay time $\tau$ as applied in weighting means 13, but also is varied to apply weighting for different frequencies, thereby generating output signal values corresponding to different frequencies $\omega$. In the illustrated form of the system the real cross-power spectrum $P_{12}(\omega)$ is computed one ordinate at a time by applying weighting $g$ in amounts varying with delay time $\tau$ but corresponding to a single frequency $\omega_1$ for a length of time assuring a reliable system response, then applying weighting $g$ in amounts varying again with delay time $\tau$ but corresponding to a different fixed frequency $\omega_2$, and so on for a multiplicity of different predetermined frequencies $\omega_m$.

Figure 7B:
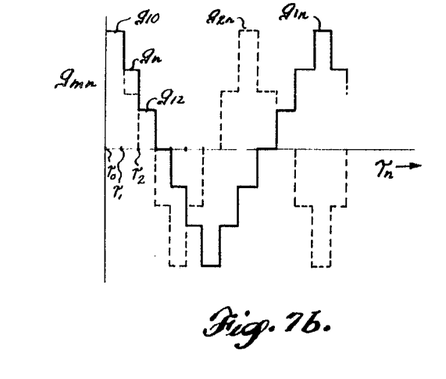

When delay times $\tau$ and $\bar{\tau}$ are varied in stepwise fashion as illustrated in FIGURE 7a, the weighting functions $g$ and $\bar{g}$ are varied also in stepwise fashion as illustrated in FIGURE 7b. The solid line step function $g_{1n}$ is a waveform closely related to a cosine function and having held weighting values $g_{10}, g_{11}, g_{12}$, etc., corresponding to the held values of delay time $\tau_n$ and having a frequency corresponding to the frequency $\omega_1$ of the cross-power ordinate being computed. A change in weighting corresponding to an increase in frequency $\omega_m$ results in an increase in the frequency of variation in weighting with respect to frequency of delay time variations, as indicated by the dotted line step function $g_{2n}$ corresponding to frequency $\omega_2$.

While only a few different delay times $\tau_n$ and weighting values are illustrated for purposes of simplicity, a typical number of time delays $\tau_n$ per cycle (L) is 24, and the weighting function $g_{mn}$ preferably passes through at least three cycles of its own per cycle of delay time variation. Typically the length L of one delay time cycle is equal to about 1/20 of the effective time constant RC of the averager in the mean product polarity indicator 22.

The system is peculiarly adapted for implementation by sampling circuits for deriving the delay times between input signals. When so implemented, the delay means 13 and 15 (FIGURE 5) comprise sampling gate circuits triggered to sample $S_2(t)$ at successive intervals of time delayed with respect to samplings of signal $S_1(t)$ by sampling means 11 (zero delay). Weighting means 74 and 76 then preferably comprise respective pluralities of different conductance paths for attenuating the delayed signals applied thereto by different predetermined weighting amounts $g$ and $\bar{g}$, according to the predetermined values of delay time and frequency. Dotted line connections 17 and 19 depict means to effect correlation of the respective weighting means with the delay time changes in the associated delay means.

Figure 8A:
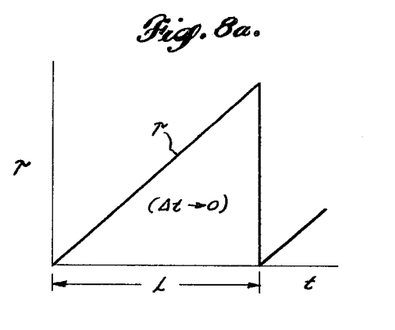
FIGURES 8a and 8b are timing diagrams illustrating changes in time delays $\tau$ and power spectrum weighting $g$, respectively, when varied in continuous fashion.
Figure 8B:
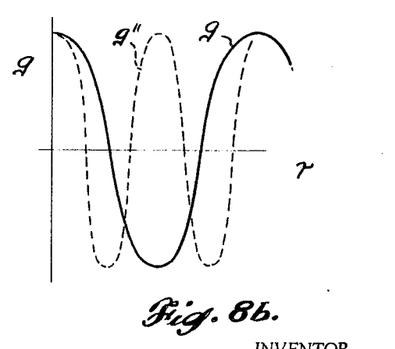

It will be recognized by those skilled in the art that any suitable means may be employed for implementing the system by applying variable delay times to the input signal $S_2(t)$ and weighting the same according to the equations set out herein (and certain modifications thereof). For example, the delay time function $\tau$ shown in FIGURE 8a is a sawtooth waveform which may be considered as a stepwise function similar to FIGURE 7a with infinitesimally small dwell times $\Delta t$. Implementation of such delays between input signals is more difficult than the stepwise function, but has advantages for certain applications. Correspondingly, the weighting function $g$ in FIGURE 8b is a continuous periodic function, the solid line function $g$ depicting weighting for one frequency $\omega$ and the dotted line function $g''$ for a higher frequency. When such a continuous function is used, then the weighting circuits 74 and 76 in effect become modulators for the delayed signals. It should be noted that the delay time function $\tau$ may be other than a linear function, in which case the weighting function $g$ would be modified from a cosine function in accordance with departures of the function $\tau$ from linearity.

It should be noted also that delaying and weighting in the separate channels need not necessarily be the same or in phase, there being no necessity for synchronization of circuits in the separate channels.

Figure 6:
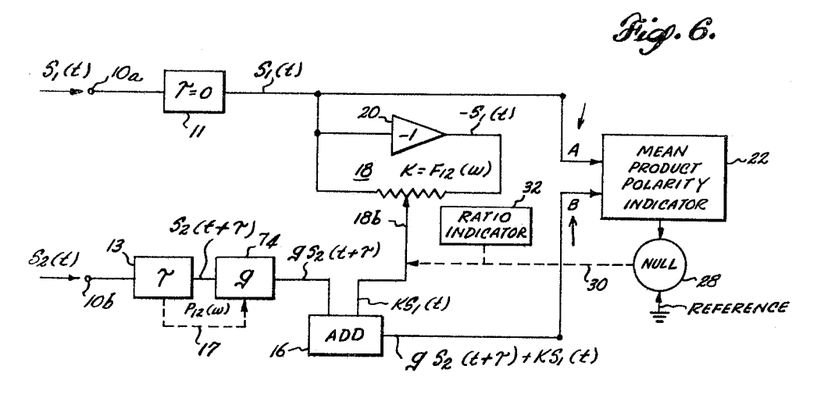
FIGURE 6 is a block diagram of the embodiment for computing one component of the *cross-power function* $F_{12}(\omega)$.

The system illustrated in FIGURE 6 computes one component of the *cross-power function* $F_{12}(\omega)$ of input signals $S_1(t)$ and $S_2(t)$, defined as the ratio of the cross-power spectrum $C_{12}(\omega)$ to the mean square of the undelayed input signal $S_1(t)$, thus:

$$F_{12}(\omega) = \frac{C_{12}(\omega)}{[S_1(t)]^2} = \frac{P_{12}(\omega)}{[S_1(t)]^2} - j\frac{I_{13}(\omega)}{[S_1(t)]^2} \quad (31)$$

This system differs from that shown in FIGURE 5 for computing the cross-power coordinate ratio function first in its omission of a separate channel for computing a reference cross-power spectrum ordinate for a fixed frequency $\bar{\omega}$. Input signal $S_2(t)$ is delayed in the single delay means 13 and weighted in weighting circuit 74 in a manner identical to that performed by the corresponding circuits in FIGURE 5. The dotted line 17 indicates synchronization of the delaying and weighting circuits as in the system of FIGURE 5.

A second difference of this system from that of FIGURE 5 is that in this case the output $gS_2(t+\tau)$ of weighting means 76 is added in adding means 16 to the first input signal $S_1(t)$ applied through the potentiometer circuit 18. The adding means output signal $$gS_2(t+\tau) + KS_1(t)$$

is then applied to input B of mean product polarity indicator 22, while signal $S_1(t)$ is applied to input A thereof. As previously described, the mean product of the A and B signals is maintained equal to zero by the servomechanism 28 which balances the mean product polarity indicator output signal by adjusting the potentiometer circuit summing ratio K, so that:

$$[S_1(t)][gS_2(t+\tau)+KS_1(t)]=0 \qquad (32)$$

From Equation 32 it is evident that the ratio $-K$ is:

$$-K=\frac{\overline{gS_1(t)S_2(t+\tau)}}{[\overline{S_1(t)}]^2} \qquad (33)$$

As in the case of the cross-power ratio function real and imaginary components of the cross-power function $F_{12}(\omega)$ are dealt with separately by introducing separate amounts of weighting $g$ according to the component desired. Thus for continuous variation of $\tau$:

$$g=\cos \omega\tau \text{ [Real]}$$
$$g'=\sin \omega\tau \text{ [Imaginary]} \qquad (34)$$

and for stepwise variation of $\tau$ similar expressions apply. Therefore, with cyclical variations in $\tau$ and $g$ as previously described, and continuous integration (averaging) by the mean product polarity indicator, the ratio $-K$ (Equation 33) may be rewritten as:

$$-K=\frac{\int_{\tau_{min.}}^{\tau_{max.}}[\overline{S_1(t)S_2(t+\tau)}]gd\tau}{[\overline{S_1(t)}]^2} \qquad (36)$$

Where $g=\cos \omega\tau$, it is seen by comparison of Equations 31 and 26 that Equation 34 gives a measure of the real component of the cross-power function $F_{12}(\omega)$:

$$-K=\frac{P_{12}(\omega)}{[\overline{S_1(t)}]^2} \qquad (37)$$

and where $g=g'=\sin \omega\tau$, it gives a measure of the imaginary component:

$$-K=\frac{I_{12}(\omega)}{[\overline{S_1(t)}]^2} \qquad (38)$$

The cross-power function is for most signals essentially independent of variations in the R.M.S. values of the input signals, since the $S_1(t)$ signal appears to the second power in the denominator of the function to compensate for the fact that the cross-power spectrum $C_{12}(\omega)$ is proportional to the product of the two input signals to the system.

Other advantages of the invention and possible modifications of the particular embodiments illustratively described herein will be recognized by those skilled in the art.

I claim as my invention:

1. A system for analyzing relationships between first and second input signals, comprising signal value deriving means, to which the second input signal is applied, for deriving successions of second signal values time-spaced from corresponding values of the first input signal, summing means having separate inputs responsive, respectively, to the output of said signal value deriving means and to one of said first and second input signals and operable to sum signal values in said separate inputs, said summing means including ratio control means operable to vary the ratio of summation of said signal values, mean product polarity indicating means having separate input channels responsive respectively to the output of the summing means and to said first input signal, said polarity indicating means being operable to form intermediate signal values indicating occurrence and polarity of deviations of the mean product of signal values in said channels from a predetermined reference level, and ratio-varying means responsive to said polarity indicating means and operative upon the ratio control means to vary the summing ratio in response to such deviations and in a sense to maintain the means product equal to said reference level.

2. The system defined in claim 1 wherein said mean product polarity indicating means comprises a multiplier and averaging means operable to form as said intermediate signal values the mean product of signals in said separate channels.

3. The system defined in claim 2 which further includes, interposed in one of said separate input channels, means for quantizing signals in said channel prior to multiplication with signals in the other of said channels.

4. The system defined in claim 3 also including quantizing means interposed in the other of said separate input channels.

5. The system defined in claim 1 wherein said mean product polarity indicating means comprises means for adding the respective signals in said separate input channels, means for deriving the difference between signals in said separate input channels, and separate means responsive respectively to said adding means and said difference deriving means for separately operating upon signals in said outputs.

6. The system defined in claim 5 wherein said mean product polarity indicating means further comprises separate averaging means responsive, respectively, to said separate operating means for forming separate sets of intermediate signal values, and wherein said ratio-varying means comprises means responsive to said separate averaging means and operable to vary said summing ratio in response to deviations of said separate sets of intermediate signal values from a predetermined referencing relationship to each other.

7. The system defined in claim 6 wherein said ratio-varying means comprises null-seeking means operable to detect differences between said separate sets of intermediate signal values and to vary said ratio in a sense to eliminate said differences.

8. The system defined in claim 5 wherein the separate operating means comprise elements having identical non-linear characteristics to which signals in said outputs are respectively applied.

9. The system defined in claim 8 comprising an electrical system wherein said elements comprise rectifiers.

10. The system defined in claim 1 wherein said ratio-control means comprises multiplying means operatively associated with one of said separate summing means inputs for multiplying signals in said input by a variable factor K prior to summation, including means operable to vary said factor K, thereby to vary said summing ratio.

11. The system defined in claim 10 comprising an electrical system wherein said multiplying means comprises a potentiometer circuit including movable wiper means operable between positional limits to apply to signal inputs thereto variable amounts of circuit impedance.

12. The system defined in claim 11 wherein said ratio-varying means comprises servo means operatively connected to said movable wiper to adjust the same positionally in accordance with occurrence and polarity of said deviations.

13. The system defined in claim 1 wherein said signal value deriving means comprises first and second separate signal delaying means, each operable to delay said second input signal with respect to the first, and having their respective outputs operatively associated with the separate summing means inputs, respectively.

14. The system defined in claim 13 wherein at least one of said first and second signal delaying means comprises variable delay means operable to vary the time relationship of said second input signal to the first input signal in accordance with a predetermined time-delay function.

15. The system defined in claim 14 wherein said first signal delaying means comprises means operable to maintain constant the time relationship between said input signals, and wherein said second signal delaying means comprises said variable delay means.

16. The system defined in claim 13 wherein each of said first and second signal delaying means comprises variable delay means operable to apply recurringly to said second input signal a set of different predetermined time-delay values.

17. The system defined in claim 16 further comprising first and second weighting means operatively associated with said first and second signal delaying means, respectively, each such weighting means comprising means operable to multiply said second input signal by predetermined weighting values and coordinating means responsive to the corresponding signal delaying means and operative upon the multiplying means to vary the weighting applied thereby in accordance with variations in delay-time values applied by said corresponding delaying means.

18. The system defined in claim 17 wherein at least one of said weighting means further includes means for varying said weighting values applied thereby also in accordance with different predetermined values of frequency, whereby to generate in said system information signal values related to respectively different ordinates of the cross-power spectrum for said input signals.

19. The system defined in claim 1 wherein said signal value deriving means comprises signal delaying means operable to delay said second input signal with respect to the first, including means operable to vary the amount of delay applied thereby, and wherein the separate inputs of the summing means are responsive, respectively, to the output of said signal delaying means and to said first input signal.

20. The system defined in claim 19 further comprising weighting means operatively associated with said signal delaying means, said weighting means comprising means operable to multiply said second input signal by predetermined weighting values and coordinating means responsive to said signal delaying means and operative upon the multiplying means to vary the weighting applied thereby in accordance with variations in delay-time values applied by said delaying means.

21. The system defined in claim 20 wherein said weighting means further includes means for varying said weighting values applied thereby also in accordance with different predetermined values of frequency, whereby to generate in said system information signal values related to respectively different ordinates of the cross-power spectrum for said input signals.

References Cited

UNITED STATES PATENTS

| | | |
|---|---|---|
| 2,918,581 | 12/1959 | Willey et al. |
| 3,011,713 | 12/1961 | Conner ______________ 235—181 |
| 3,018,962 | 1/1962 | Jones et al. __________ 235—181 |
| 3,134,896 | 5/1964 | Briggs ______________ 235—181 |

OTHER REFERENCES

F. H. LANGE: Korrelations—Electronik (published by Veb Verlag Technik, Berlin, 1959), pp. 119, 128–129, 135, 138.

MALCOLM A. MORRISON, *Primary Examiner.*

I. KESCHNER, J. RUGGIERO, *Assistant Examiners.*